(12) United States Patent
McNamara et al.

(10) Patent No.: US 11,288,145 B2
(45) Date of Patent: Mar. 29, 2022

(54) WORKLOAD REPETITION REDUNDANCY

(71) Applicant: Imagination Technologies Limited, Kings Langley (GB)

(72) Inventors: Damien McNamara, Hertfordshire (GB); Jamie Broome, Hertfordshire (GB); Ian King, Hertfordshire (GB); Wei Shao, Hertfordshire (GB); Mario Sopena Novales, Hertfordshire (GB); Dilip Bansal, Hertfordshire (GB)

(73) Assignee: Imagination Technologies Limited, Kings Langley (GB)

( * ) Notice: Subject to any disclaimer, the term of this patent is extended or adjusted under 35 U.S.C. 154(b) by 58 days.

(21) Appl. No.: 16/703,192

(22) Filed: Dec. 4, 2019

(65) Prior Publication Data

US 2020/0174897 A1    Jun. 4, 2020

(30) Foreign Application Priority Data

Dec. 4, 2018 (GB) ...................... 1819808

(51) Int. Cl.
*G06F 11/16* (2006.01)
*G06F 9/50* (2006.01)
*G06T 1/20* (2006.01)

(52) U.S. Cl.
CPC ........ *G06F 11/1633* (2013.01); *G06F 9/5027* (2013.01); *G06T 1/20* (2013.01); *G06F 2201/82* (2013.01)

(58) Field of Classification Search
CPC .............. G06F 11/1633; G06F 9/5027; G06F 2201/82; G06F 11/1497; G06F 11/1629; G06F 11/1004; G06F 11/1641; G06T 1/20

USPC ........................................................... 714/57
See application file for complete search history.

(56) References Cited

U.S. PATENT DOCUMENTS

| | | | |
|---|---|---|---|
| 6,571,363 B1 | 5/2003 | Steiss | |
| 6,615,366 B1 | 9/2003 | Grochowski | |
| 7,941,698 B1 | 5/2011 | Aggarwal et al. | |
| 10,754,760 B1 * | 8/2020 | Levy | G06F 11/3656 |
| 2002/0073357 A1 | 6/2002 | Dhong et al. | |
| 2007/0277023 A1 | 11/2007 | Weiberle et al. | |

(Continued)

FOREIGN PATENT DOCUMENTS

GB    2 431 258 A    4/2007

*Primary Examiner* — Yair Leibovich
(74) *Attorney, Agent, or Firm* — Potomac Law Group, PLLC; Vincent M DeLuca

(57) ABSTRACT

A graphics processing system includes a plurality of processing units for processing tasks, each processing unit being configured to process a task independently from any other processing unit of the plurality of processing units; a check unit operable to form a signature which is characteristic of an output of a processing unit on processing a task; and a fault detection unit operable to compare signatures formed at the check unit; wherein the graphics processing system is configured to process each task of a first type first and second times at the plurality of processing units so as to, respectively, generate first and second processed outputs, wherein the check unit is configured to form first and second signatures which are characteristic of, respectively, the first and second processed outputs, and wherein the fault detection unit is configured to compare the first and second signatures and raise a fault signal if the first and second signatures do not match.

21 Claims, 10 Drawing Sheets

(56) References Cited

U.S. PATENT DOCUMENTS

| | | |
|---|---|---|
| 2009/0182991 A1 | 7/2009 | Quach |
| 2011/0125997 A1 | 5/2011 | Weiberle et al. |
| 2012/0047351 A1 | 2/2012 | Morrison et al. |
| 2012/0317576 A1 | 12/2012 | Mueller et al. |
| 2014/0181594 A1 | 6/2014 | Sridharan et al. |
| 2014/0368513 A1 | 12/2014 | Lyashevsky et al. |
| 2017/0364332 A1 | 12/2017 | Lowell |
| 2018/0184080 A1 | 6/2018 | Kaya et al. |
| 2018/0260564 A1 | 9/2018 | Porteboeuf |
| 2018/0267868 A1 | 9/2018 | Bose et al. |
| 2019/0146998 A1* | 5/2019 | Jin .......................... G06F 9/46 718/104 |
| 2020/0174829 A1* | 6/2020 | Shao .................. G06F 11/1497 |

* cited by examiner

US 11,288,145 B2

WORKLOAD REPETITION REDUNDANCY

BACKGROUND

The present disclosure relates to graphics processing systems and methods of processing tasks at graphics processing systems.

In safety-critical systems, at least some of the components of the system must meet safety goals sufficient to enable the system as a whole to meet a level of safety deemed necessary for the system. For example, in most jurisdictions, seat belt retractors in vehicles must meet specific safety standards in order for a vehicle provided with such devices to pass safety tests. Likewise, vehicle tyres must meet specific standards in order for a vehicle equipped with such tyres to pass the safety tests appropriate to a particular jurisdiction. Safety-critical systems are typically those systems whose failure would cause a significant increase in the risk to the safety of people or the environment.

Data processing devices often form an integral part of safety-critical systems, either as dedicated hardware or as processors for running safety-critical software. For example, fly-by-wire systems for aircraft, driver assistance systems, railway signalling systems and control systems for medical devices would typically all be safety-critical systems running on data processing devices. Where data processing devices form an integral part of a safety-critical system it is necessary for the data processing device itself to satisfy safety goals such that the system as a whole can meet the appropriate safety level. In the automotive industry, the safety level is normally an Automotive Safety Integrity Level (ASIL) as defined in the functional safety standard ISO 26262.

Increasingly, data processing devices for safety-critical systems comprise a processor running software. Both the hardware and software elements must meet specific safety goals. Software failures are typically systematic failures due to programming errors or poor error handling. For software, the safety goals are typically achieved through rigorous development practices, code auditing and testing protocols. For the hardware elements of a data processing device, such as processors, safety goals may be expressed as a set of metrics, such as a maximum number of failures in a given period of time (often expressed as Failures in Time, or FIT), and the effectiveness of mechanisms for detecting single point failures (Single Point Failure Mechanisms, or SPFM) and latent failures (Latent Failure Mechanisms, or LFM). It is important that data processing hardware is designed to handle some level of errors because, even if systematic errors could be completely excluded from a safety-critical system, random errors can be introduced into hardware, e.g. by transient events (e.g. due to ionizing radiation, voltage spikes, or electromagnetic pulses). In binary systems transient events can cause random bit-flipping in memories and along the data paths of a processor.

There are various approaches to achieving safety goals in data processing hardware: for example, by providing redundancy so that if one component fails another is available to perform the same task, or through the use of check data (e.g. parity bits or error-correcting codes) to allow the hardware to detect and/or correct for minor data corruptions. Data processors can be provided in a dual lockstep arrangement 100 as shown in FIG. 1 in which a pair of identical processing cores 101 and 102 are configured to process a stream of instructions 103 in parallel. The output of either one of the processing cores (101) may be used as the output 104 of the lockstep processor. When the outputs of the processing cores 101 and 102 do not match, a fault can be raised to the safety-critical system. However, since a second processing core is required, dual lockstep processors necessarily consume double the chip area compared to conventional processors and consume approximately twice the power.

A delay 105 can be introduced on the input to one of the cores so as to improve the detection probability of errors induced by extrinsic factors such as ionizing radiation and voltage spikes (with typically a corresponding delay 106 being provided on the output of the other core). By adding further processor cores to a lockstep processor 100, it can be possible to continue to provide an error-free output: the output of the processor may be that provided by two or more of its processing cores, with the output of a processing core which does not match the other cores being disregarded. However, this further increases the area and power consumption of the processor.

Advanced driver-assistance systems and autonomous vehicles may incorporate data processing systems that are suitable for such safety-critical applications which have significant graphics and/or vector processing capability, but the increases in the area and power consumption (and therefore cost) of implementing a dual lockstep processor might not be acceptable or desirable. For example, driver-assistance systems often provide computer-generated graphics illustrating hazards, lane position, and other information to the driver. Typically this will lead the vehicle manufacturer to replace a conventional instrument cluster with a computer-generated instrument cluster which also means that the display of safety-critical information such as speed and vehicle fault information becomes computer-generated. Such processing demands can be met by graphics processing units (GPUs). However, in the automotive context, advanced driver-assistance systems typically require a data processing system which meets ASIL level B of ISO 26262.

Autonomous vehicles must in addition process very large amounts of data (e.g. from RADAR, LIDAR, map data and vehicle information) in real-time in order to make safety-critical decisions hundreds of times a second. Graphics processing units can also help meet such processing demands but safety-critical systems in autonomous vehicles are typically required to meet the most stringent ASIL level D of ISO 26262.

SUMMARY

This summary is provided to introduce a selection of concepts that are further described below in the detailed description. This summary is not intended to identify key features or essential features of the claimed subject matter, nor is it intended to be used to limit the scope of the claimed subject matter.

There is provided a graphics processing system comprising: a plurality of processing units for processing tasks, each processing unit being configured to process a task independently from any other processing unit of the plurality of processing units; a check unit operable to form a signature which is characteristic of an output of a processing unit on processing a task; and a fault detection unit operable to compare signatures formed at the check unit; wherein the graphics processing system is configured to process each task of a first type first and second times at the plurality of processing units so as to, respectively, generate first and second processed outputs, wherein the check unit is configured to form first and second signatures which are characteristic of, respectively, the first and second processed outputs, and wherein the fault detection unit is configured to compare the first and second signatures and raise a fault signal if the first and second signatures do not match.

The first processing unit of the plurality of processing units may be configured to process the task on the first time of processing, and a second processing unit of the plurality of processing units is configured to process the first task on the second time of processing.

The second processing unit may receive the task independently to the first processing unit.

The graphics processing system may be configured such that the second processing unit is constrained to be any processing unit of the plurality of processing units other than the first processing unit.

The graphics processing system may be configured such that the first and second processing units are permitted to be the same processing unit.

The graphics processing system may further comprise a cache for holding tasks of the first type for processing at the plurality of processing units, wherein a task of the first type is not removed from the cache when a processing unit retrieves that task for processing for a first time.

Each task of the first type may include an identifier having a least two states: an initial state indicating that the task has not been processed for a first time, and a second state indicating that the task has been processed for a first time.

Each processing unit of the plurality of processing units may be configured to, on processing a task of a first type for a first time, update the identifier from the initial state to the second state.

Each processing unit of the plurality of processing units may be configured to, on accessing a cache of tasks of the first type at the graphics processing system, retrieve a task of a first type having an identifier in the second state only if the processing unit did not process that task when processed for a first time.

The graphics processing system may include an allocation unit configured to allocate tasks of the first type to the first and second processing units.

The plurality of processing units may comprise three or more processing units.

The check unit may be configured to store the first signature formed in respect of the first processed output for subsequent use by the fault detection unit on comparing the first signature to the second signature.

Each task of the first type may be a safety task which is to be processed according to a predefined safety level.

Each task of a second type may be processed only a first time at the plurality of processing units so as to generate a respective single processed output.

Each task of the second type may be a non-safety task which is not to be processed according to a predefined safety level.

The check unit may be configured to not form a signature which is characteristic of the single processed output.

The graphics processing system may further comprise one or more other processing units configured to process tasks of a second type, the one or more other processing units being configured to process each task of the second type only a first time.

The graphics processing system may further comprise a data store to which the graphics processing system is configured to write one or more processed outputs in respect of each task of the first type.

The graphics processing system may be configured to write only one of the first and second processed outputs to the data store.

The check unit may be configured to read back processed data written to the data store in respect of a task of the first type so as to generate a further signature which is characteristic of that processed data held at the data store, and the fault detection unit is configured to compare the further signature to one or both of the first and second signatures generated by the check unit in respect of the same task of the first type, the fault detection unit being configured to raise a fault signal if the further signature does not match one or both of the first and second signatures.

The plurality of processing units, check unit and fault detection unit may be provided at a graphics processing unit of the graphics processing system, and the check unit may be configured to make available the first and/or second signatures to a second check unit external to the graphics processing unit, the second check unit being configured to read back processed data written to the data store by the graphics processing unit in respect of a task of the first type so as to generate a further signature characteristic of that processed data held at the data store, and a second fault detection unit provided for the second check unit may be configured to compare the further signature to one or both of the first and/or second signatures made available by the check unit in respect of the same task of the first type, the second fault detection unit being configured to raise a fault signal if the further signature does not match one or both of the first and second signatures.

The data store may comprise one or more memories located at or external to a graphics processing unit of the graphics processing system and/or one or more caches located at or external to a graphics processing unit of the graphics processing system.

The check unit may be configured to form each signature characteristic of the processed output from a processing unit of the plurality of processing units by performing one or more of a checksum, CRC, a hash and a fingerprint over that processed data.

The processed data may include one or more memory addresses associated with the respective processed task.

Each task of the first type may relate to a tile and the graphics processing system is configured to perform tile-based graphics rendering.

The fault signal may comprise one or more of a control message, a flag, an interrupt, a signal to set one or more register bits, a data packet, and a signal to write data to a data store.

There is provided a method of processing tasks at a graphics processing system having a plurality of processing units each configured to process a task independently from any other processing unit, the method comprising, on receiving a task of a first type for processing: process the task for a first time at a first processing unit and form a first signature characteristic of the output of that first processing unit; process the task for a second time at a second processing unit and form a second signature characteristic of the output of that second processing unit; compare the first and second signatures; and if the first and second signatures do not match, raise a fault signal.

The graphics processing system may be embodied in hardware on an integrated circuit. There may be provided a method of manufacturing, at an integrated circuit manufacturing system, the graphics processing system. There may be provided an integrated circuit definition dataset that, when processed in an integrated circuit manufacturing system, configures the system to manufacture the graphics processing system. There may be provided a non-transitory computer readable storage medium having stored thereon a computer readable description of an integrated circuit that, when processed in an integrated circuit manufacturing system, causes the integrated circuit manufacturing system to manufacture the graphics processing system.

There may be provided an integrated circuit manufacturing system comprising: a non-transitory computer readable storage medium having stored thereon a computer readable integrated circuit description that describes the graphics processing system; a layout processing system configured to process the integrated circuit description so as to generate a circuit layout description of an integrated circuit embodying the graphics processing system; and an integrated circuit generation system configured to manufacture the graphics processing system according to the circuit layout description.

There may be provided computer program code for performing a method as described herein. There may be provided non-transitory computer readable storage medium having stored thereon computer readable instructions that, when executed at a computer system, cause the computer system to perform the methods as described herein.

BRIEF DESCRIPTION OF THE DRAWINGS

The present invention is described by way of example with reference to the accompanying drawings. In the drawings.

DETAILED DESCRIPTION

Figure 1:
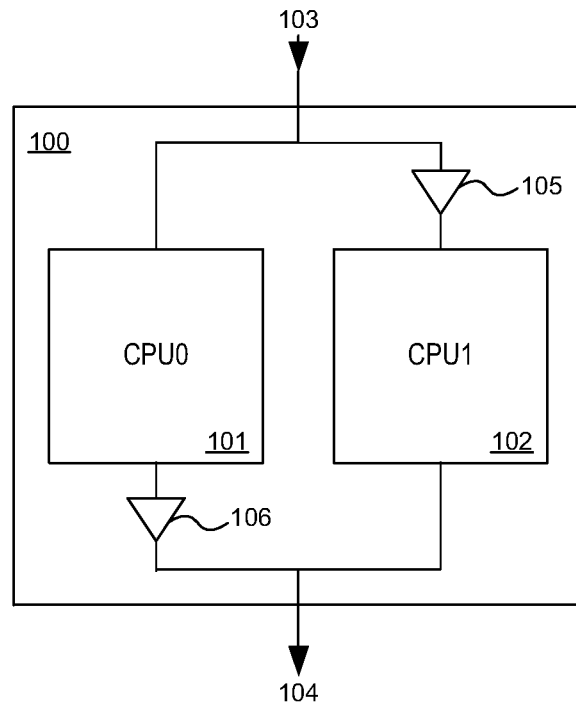
FIG. 1 shows a conventional dual lockstep processor.

The following description is presented by way of example to enable a person skilled in the art to make and use the invention. The present invention is not limited to the embodiments described herein and various modifications to the disclosed embodiments will be apparent to those skilled in the art. Embodiments are described by way of example only.

The present disclosure relates to a graphics processing system comprising a plurality of processing units operable to process a plurality of tasks in parallel. A graphics processing system configured in accordance with the principles herein may have any suitable architecture—for example, the system could be operable to perform immediate mode rendering or tile-based rendering (including tile based deferred rendering), and/or any kind of graphics, image or video processing, and/or general processing. In examples, the processing units of a graphics processing system may be configurable so as to enable different processing units to execute different sets of actions at a given point in time and/or enable a given processing unit to execute different sets of actions at different times. Each processing unit may be able to process tasks independently of any other processing unit. Therefore, a task processed at one processing unit may not cooperate with another processing unit in order to process that task (e.g. an individual task is not processed in parallel at more than one processing unit, although an individual task could be processed in parallel at a single processing unit).

The processing units may be, for example, any kind of graphical and/or vector and/or stream processing units. A processing unit may comprise a rendering pipeline. Each processing unit may be a different physical core of a GPU. Graphics processing systems may be applied to general computing tasks, particularly those which can be readily parallelised. Examples of general computing applications include signal processing, audio processing, computer vision, physical simulations, statistical calculations, neural networks and cryptography.

A task may be any portion of work for processing at a graphics processing unit, including all or part of a scene for rendering to memory or a display screen, all or part of an image or video frame, or any other data. A task for a graphical processing application may relate to any aspect of graphics processing, including tiling, geometry calculations, texture mapping, shading, anti-aliasing, ray tracing, pixelization and tessellation. In tiled renderers, each task may relate to a tile. More generally a task need not relate to the processing of graphical data. For example, a task may be any kind of data which the processing units of a graphics processing system may be configured to process, such as vector data. A graphics processing system may be configured to operate on a plurality of different types of task. In some architectures, different processing units or groups of processing units may be allocated to process different types of task.

Figure 2:
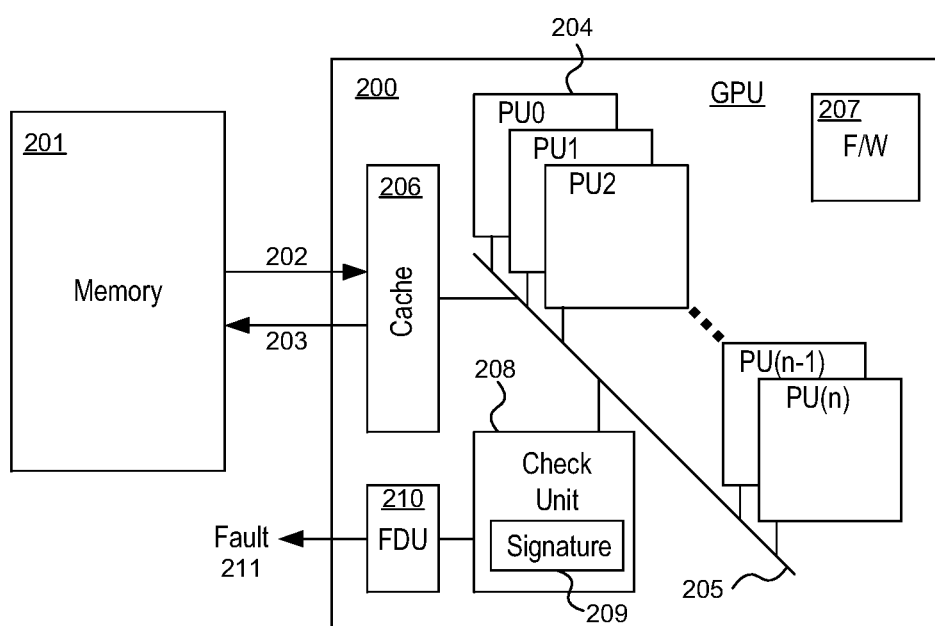
FIG. 2 shows a graphics processing system configured in accordance with the principles described herein.

FIG. 2 shows a graphics processing system configured in accordance with the principles described herein is shown in FIG. 2. The graphics processing unit (GPU) 200 is part of the graphics processing system. The GPU 200 comprises a plurality of processing units 204, labelled in the figure as PU0 to PU(n). The GPU 200 may include one or more caches and/or buffers 206 configured to receive data 202 from a memory 201, and provide processed data 203 to the memory 201. The memory 201 may comprise one or more data storage units arranged in any suitable manner. Typically memory 201 would comprise one or more of a memory dedicated to the GPU, a frame buffer, and a system memory of a computer system at which the GPU is supported. In some examples, at least part of the memory 201 may be considered to form part of the graphics processing system.

The various units of the GPU 200 may communicate over one or more data buses and/or interconnects 205. The GPU may comprise firmware 207—for example to provide low-level control of the units of the GPU.

Each of the processing units 204 of the GPU are operable to process a task, with the processing units being arranged such that a plurality of processing units can each perform a respective task at the same time. In this manner the GPU can concurrently process a plurality of tasks. Each task is arranged to process a portion of data received at the GPU, for example from memory 201. Each processing unit may comprise a plurality of configurable functional elements (e.g. shaders, geometry processors, vector processors, rasterisers, texture units, etc.) so as to enable a given processing unit to be configured to perform a range of different processing actions. A processing unit may process a task by performing a set of actions on the data portion for the task. The set of actions may be defined as appropriate to a given task—for example, in a system in which tasks relate to respective tiles of a frame and each tile comprises a plurality of primitives, the set of processing actions may comprise geometry processing, shading, texturing, etc. A processing unit may be configured by means of, for example, a software driver of the GPU passing appropriate commands to firmware 207 so as to enable/disable the functional elements of the processing unit so as to cause the processing unit to perform different sets of processing actions. In this manner, a first set of processing units may be configured to, for example, perform shader processing on graphical tasks representing part of a computer-generated image of a scene (e.g. a tile), while another set of processing units may be configured to, for example, perform vector processing of sensor data received from vehicular sensors.

On processing a task, a processing unit 204 generates output data in respect of that task. The GPU 200 includes a check unit 208 which is operable to receive output data from a processing unit and form a signature which is characteristic of that output data. The check unit may perform, for example, a checksum, hash, CRC, or fingerprint calculation on the output data. The check unit operates on at least data generated on a processing unit processing a task. Preferably the check unit additionally operates on memory addresses and/or control data associated with that generated data—this can help the validation operations described herein to identify a wider range of faults. The signature provides an expression of the processing performed on a task by a processing unit in a more compact form than the output data itself so as to facilitate comparison of the output data provided by different processing units. Preferably the check unit forms a signature over all of the output data (which might not include any control data) received from a processing unit in respect of a task, but the signature could be formed over some (e.g. not all) of the output data received from a processing unit in respect of a task. The check unit 208 may receive output data from a processing unit over the data bus/interconnect 205.

The check unit 208 may comprise a data store 209 for storing one or more signatures formed at the check unit. Alternatively or additionally the check unit may make use of a data store external to the check unit (e.g. at a memory of the GPU 200) for storing one or more signatures formed at the check unit. The check unit may receive output data from all or a subset of the processing units of the GPU. The check unit may comprise a plurality of check unit instances—for example, each check unit instance may be configured to receive output data from a different subset of processing units of the GPU.

The GPU 200 further comprises a fault detection unit 210 which is configured to compare two or more signatures formed at the check unit 208. The fault detection unit 210 is configured to raise a fault signal 211 on determining that signatures do not match. A fault could potentially lead to a safety violation at the GPU. The fault signal may be provided in any suitable manner as an output of the GPU 200. For example, the fault signal may be one or more of: control data; an interrupt; data written out to memory 201; and data written to a register or memory of the GPU 200 or a system to which the GPU is connected.

The fault detection unit 210 is for comparing the signatures of output data from different processing units 204 arranged to process the same task. Two or more processing units may be arranged to process the same task—the processing performed by the processing units may or may not be concurrent. If only two processing units are arranged to process the same task, comparing the signatures characteristic of the output data from the processing units indicates whether the processing performed by the pair of processing units is in agreement. When the signatures of a pair of processing units in respect of a given task do not match, the fault signal 211 indicates that a fault occurred at one of the processing units of the pair but the fault signal does not indicate which unit experienced the fault.

If a group of three or more processing units are arranged to process the same task, comparing the signatures characteristic of the output data from those processing units indicates whether the processing performed by the processing units is in agreement. When the signatures of each of the group of processing units in respect of a given task do not match, the fault signal 211 indicates that a fault occurred at one of the processing units of the group and it can further indicate at which one of the processing units of the group the fault occurred. This is because the fault can be assumed to have occurred at the processing unit whose signature does not match the signatures of the outputs from the two or more other processing units.

Figure 3:
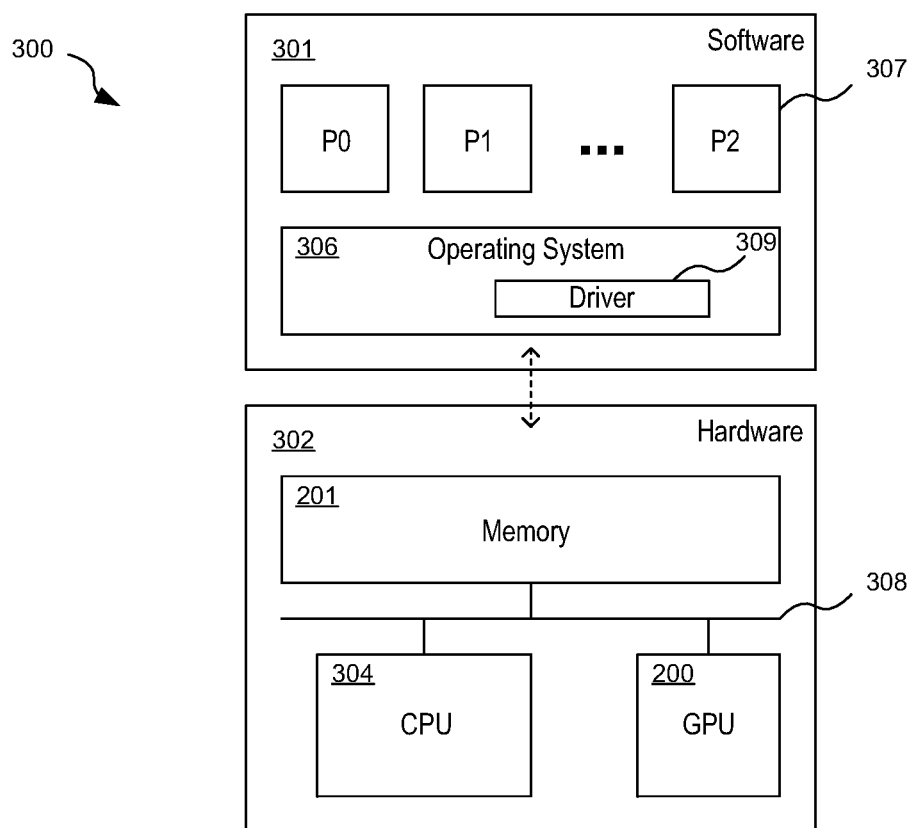
FIG. 3 shows a data processing system comprising a graphics processing system configured in accordance with the principles described herein.

Typically the GPU 200 will be incorporated into a data processing system such as data processing system 300 in FIG. 3. Such a data processing system may comprise other processors such as a central processing unit (CPU) 304 and memory 201. The hardware 302 may comprise one or more data buses and/or interconnects 308 over which the processors 200, 304 and memory 201 may communicate. Typically a software environment 301 is provided at the data processing system in which a plurality of processes 307 may execute. An operating system 306 may provide an abstraction of the available hardware 302 to the processes 307. The operating system may include a driver 309 for the GPU so as to expose the functionalities of the GPU to the processes. All or part of the software environment 301 may be provided as firmware. In an example, the data processing system 300 forms part of a vehicle control system, with the processes each performing one or more control functions of the vehicle, such as instrument cluster display, entertainment system, engine management, climate control, lane control, steering correction, automatic braking systems, etc. One or more of the processes 307 may be safety-critical processes. The processes may be a mix of safety-critical processes which must be executed according to a predefined safety level and non-safety-critical processes which do not need to be executed according to a predefined safety level.

A fault signal may be used in any manner by a data processing system 300 in which the GPU is incorporated. For example, on a fault signal being raised by the fault detection unit, the system in which the GPU is incorporated may discard output data formed in respect of the subject task and/or cause the task to be resubmitted to the GPU for reprocessing. A graphics processing system configured in accordance with the principles described herein may comprise other elements in addition to a GPU, such as a software driver 309 for the GPU. The graphics processing system may itself use the fault signal 211. For example, the graphics processing system may log fault signals and the processing units those faults are associated with, and if one or more processing units exceed a predefined number of faults (perhaps within some defined time period), those one or more processing units may be disabled or otherwise prevented from processing tasks received at the GPU.

The graphics processing system as shown in FIG. 2 is operable to process tasks so as to meet a predefined safety level. For example, the graphics processing system may be certified to meet the ASIL B or ASIL D standards of ISO 26262. Tasks which require processing to the predefined safety level may be tasks relating to safety-critical functions of a data processing system 300 into which the graphics processing system may be incorporated. For example, in an automotive application, tasks which are safety-critical may be those tasks relating to the rendering of instrument clusters, and/or the image processing of data captured by one or more vehicle cameras for use in a lane assist system.

In some examples, the GPU performs tiled rendering and each of the tasks on which its processing units operate relates to a tile.

Workload Repetition

Figure 4:
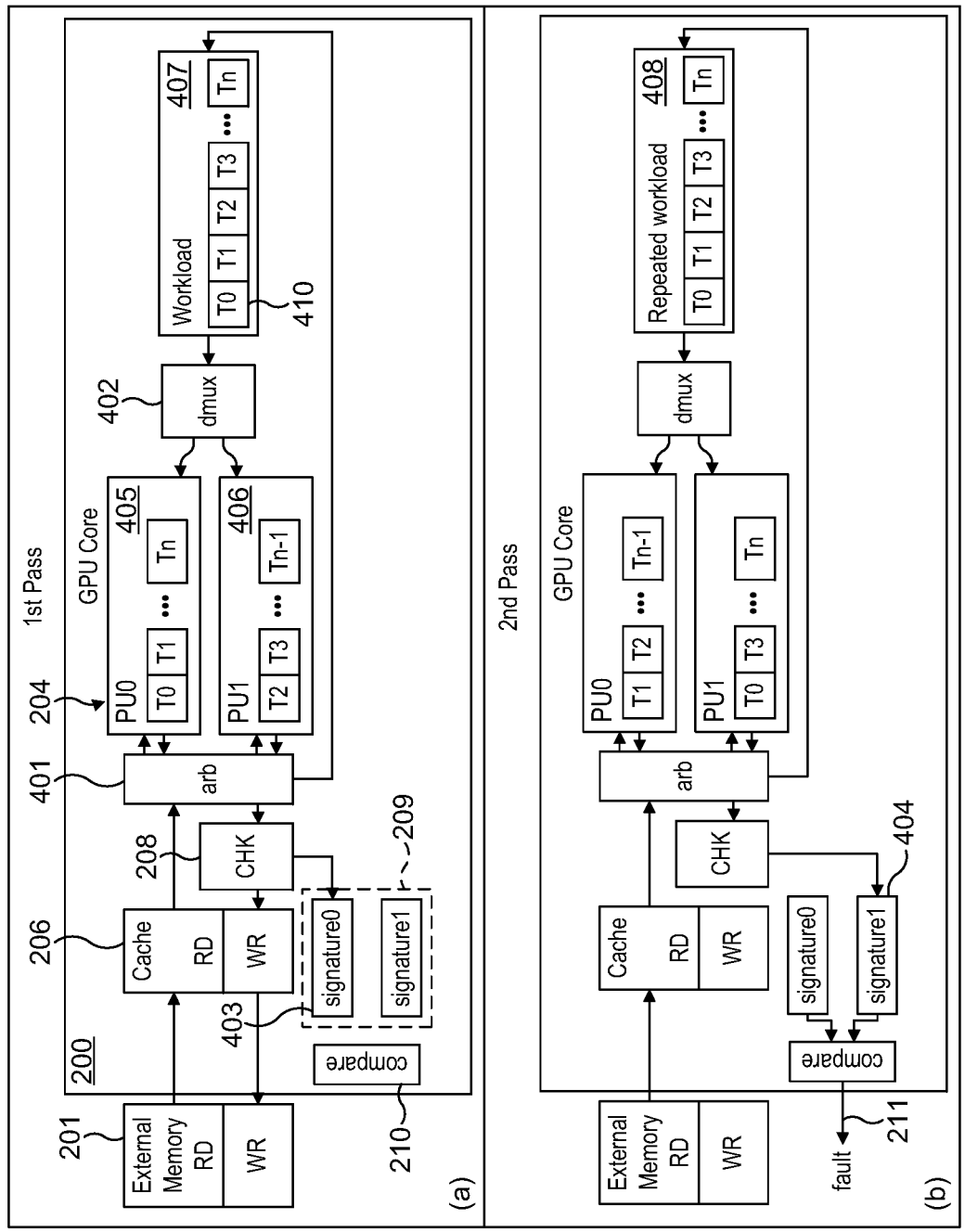
FIG. 4 is a schematic diagram illustrating the operation of a graphics processing system according to a first example.
Figure 8:
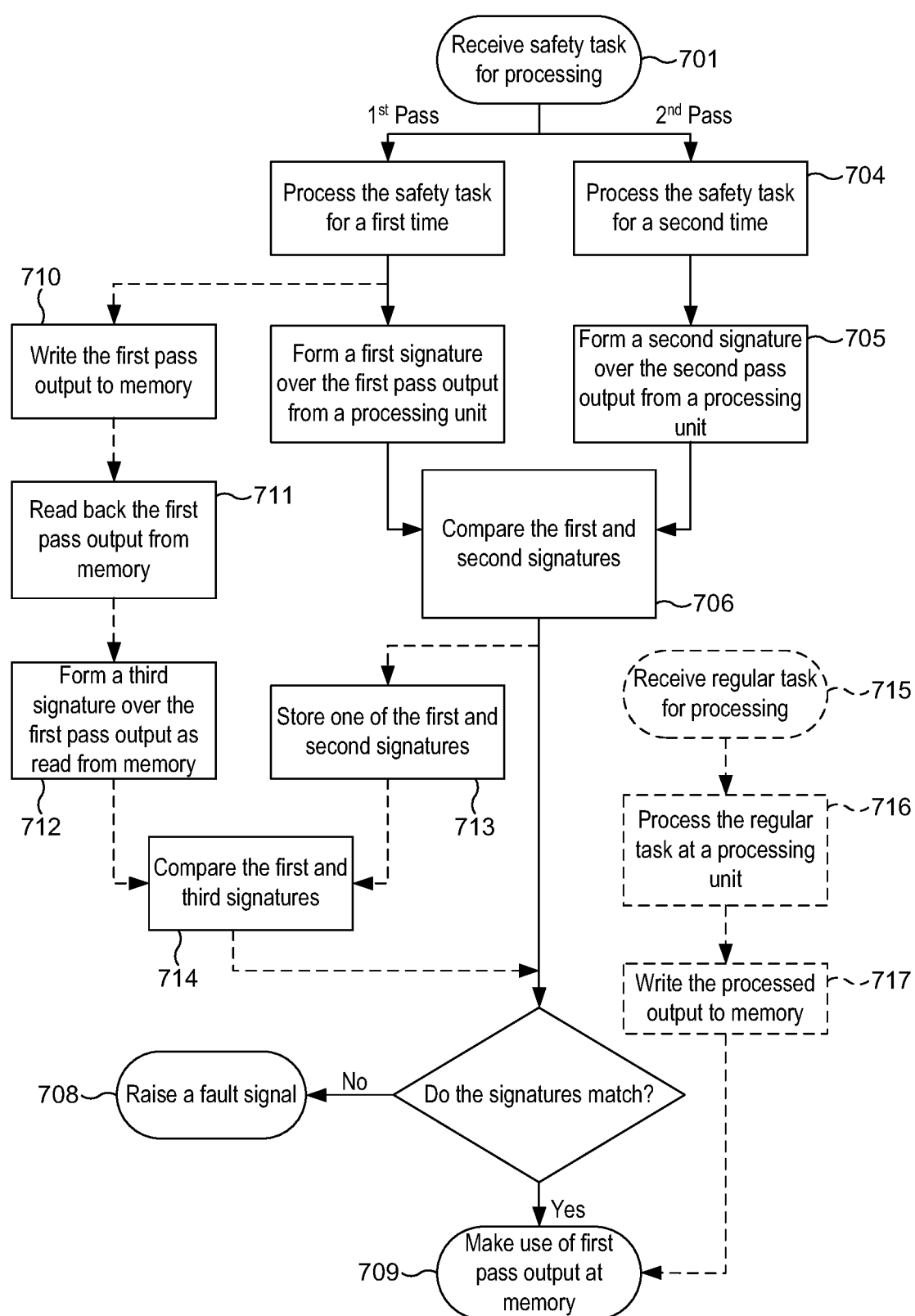
FIG. 8 is a flowchart illustrating the operation of a graphics processing system configured in accordance with the principles described herein.

The operation of the graphics processing system of FIG. 2 will now be described with respect to a first example shown in FIG. 4 and the flowchart shown in FIG. 8. FIG. 4 includes two schematic diagrams, (a) and (b), which illustrate the operation of GPU 200 on processing tasks relating to a safety-critical function. In FIG. 4(a), a pair of processing units 405 and 406 of a plurality of processing units 204 are arranged to receive tasks for processing from a workload of tasks 407. Typically the GPU would have more than two processing units. The workload 407 could, for example, be a buffer of tasks 410 at cache 206. For clarity, in the figure the workload 407 is schematically shown separate to the cache but it may be supported at the cache and/or any other data store of the GPU (including at the processing units themselves) and/or a data store external to the GPU (e.g. at external memory 201). Each task received for processing 701 may be a safety task which is to be processed in accordance with a predefined safety level.

Each task 410 is received at a processing unit for processing. This may be achieved in any suitable manner and, in general, the GPU may have any kind of architecture and may utilise any scheme for allocating tasks to processing units. In the example illustrated in FIG. 4, a demultiplexer 402 is schematically shown allocating tasks to the processing units 405 and 406. Demultiplexer 402 schematically represents the distribution of tasks amongst processing units and does not imply the existence of a unit for explicitly allocating tasks to processing units. For example, each processing unit 204 may be configured to request or otherwise receive tasks from the workload 407. A processing unit may be configured to retrieve one or more tasks from the workload 407 as and when the processing unit is able to begin processing those tasks. Demultiplexer 402 may be any kind of allocation unit for allocating tasks to processing units. The demultiplexer may allocate tasks to a processing unit by marking or otherwise identifying tasks of the workload as being for processing at a particular processing unit—for example, the demultiplexer may cause tasks to be allocated to a processing unit by allocating the task to an input buffer of that processing unit from which the processing unit retrieves its tasks.

Each task may be processed at any processing unit of a plurality of processing units. Only two processing units 405 and 406 are shown in FIG. 4 but typically there would be more. The plurality of processing units available for processing tasks in the manner described herein may be a subset of the total number of processing units at the graphics processing system.

An arbitration unit 401 may be provided to arbitrate the communication of data around the GPU (e.g. over a data bus and/or interconnect 205). The arbitration unit may be configured to direct tasks received from external memory 201 (optionally via cache 206) to the workload 407 for processing at the processing units. The arbitration unit may be configured to direct processed data output by the processing units to the external memory 206 (optionally via cache 206) and to check unit 208.

The check unit 208 is configured to receive the data output by each processing unit 204 and form a signature which is characteristic of that output data. On a task being processed at a processing unit, the signature of the respective output of that processing unit may be stored by the check unit at data store 209. For example, with reference to FIG. 4(a), on task T0 being processed at processing unit 405, a signature 403 of the output of processing unit 405 may be stored at data store 209.

In order to meet the required safety level, the GPU is configured to process all of the safety tasks of the workload 407 at least twice: a first time 702 at a first processing unit and a second time 704 at a second processing unit. As will be described, the first and second processing units may or may not be the same processing unit, depending on the particular implementation. Each processing instance of a task will be referred to as a pass. Each pass of a given task may or may not be processed concurrently with one or more other passes. The repetition of task processing is illustrated in FIG. 4(b) in which the tasks of a repeated workload 408 are processed at the processing units 405 and 406. Generally, tasks may be processed for a first time at any processing unit of the plurality of units and processed for a second (or further) time at any processing unit of the plurality of units. This has the advantage that tasks (whether on the first or a further pass) can be dynamically allocated to processing units so as to efficiently spread the processing load and avoid idle processing units. The repeated workload is schematic and represents that set of tasks whose processing is to be repeated at the GPU.

In some examples, at least some of the tasks of the repeated workload 408 are not read for a second time from the external memory and the tasks of the workload 407 are re-used by causing the processing units to process the tasks for a second time. This avoids unnecessary reads from external memory which consume bandwidth and waste power. However, this can be at the expense of isolation between processing passes. In some examples, a task may be independently read from memory on each processing pass of the task. This can help protect against data corruption of data cached at the GPU.

In the example shown in FIG. 4, the processing units 405 and 406 are able to receive any task from the workload 407 or 408. More generally, any of a plurality of processing units may be able to receive any task of a workload. It can be seen in FIG. 4(a) that, on processing the tasks of the workload for the first time, processing unit 405 receives tasks T0 and T1, and processing unit 406 receives tasks T2 and T3. Since tasks may be received at either processing unit, when the workload is repeated as shown in FIG. 4(b), processing unit 405 happens to receive tasks T1 and T2, and processing unit 406 receives tasks T0 and T3. Tasks T0 and T2 are therefore processed once at each processing unit, whereas tasks T1 and T3 are processed twice at the same processing unit.

A signature 403 is formed 703 at the check unit 208 in respect of each of the tasks processed in the first pass shown in FIG. 4(a). The signatures 403 may be stored at data store 209. On the tasks being processed in the second pass shown in FIG. 4(b), a signature 404 is formed 705 at the check unit 208 in respect of each of the tasks processed in the second pass. The signature 404 may be stored at data store 209. Fault detection unit 210 is configured to compare 706 the signatures 403 and 404 formed in respect of the first and second processing passes of a task. If the signatures do not match 708 then a fault signal 211 is raised. If the signatures do match 709 then the processed task data generated at the graphics processing system in respect of that task may be considered valid and used in a manner appropriate to the application (e.g. in an automotive context the processed task data may represent graphical data for output to an instrument console). If the signatures match then no fault signal may be raised or, in some examples, a signal may be raised indicating that the signatures do match. Signatures that do not match indicate that the processed output from the two passes are not the same and therefore the processed output from one or both of the processing unit(s) is invalid. The output of processing unit(s) configured to process the same task may differ due to transient events such as ionizing radiation or voltage spikes, or permanent errors due to bugs in some combination of hardware, software and firmware.

The fault signal may be any kind of indication that a fault has occurred, including, for example, one or more of a control message, an interrupt, a flag in control data, one or more bits set at a register, and a data packet.

In the example shown in FIG. 4, the workloads are shown as being processed sequentially in time (i.e. the tasks of workload 407 are processed and then the tasks of workload 408 are processed). In general, the processing of tasks may be repeated in one or more different ways, including: by processing the same task concurrently at different processing units; by including multiple copies of the same task in a workload so as to cause the task to be processed multiple times; by causing a task to persist in the workload once it has been allocated to a processing unit so that it remains available for further processing at the same/another processing unit.

Each task of a workload may be processed more than twice, with a signature being formed at the check unit 208 in respect of each pass of a task through a processing unit. This can enable the GPU to continue to provide a valid output even if one of the processing passes is corrupted. The output of the processor may be that provided by a majority of the processing cores which process a particular task, with the output of a processing core which does not match the other cores being disregarded. However, this may increase the area, power consumption and latency of the processor.

The graphics processing system may be configured to write out to external memory 201 one or more of the processed outputs generated at the processing unit(s) in respect of each task. It can be advantageous to provide only one of the processed outputs to external memory so as to minimise the memory bandwidth consumed. The output of the first processing unit to process a task may be written out 710 to external memory with the output of further processing units being discarded once the respective signature has been formed at the check unit. This can have the advantage that the processed task is available sooner to a data processing system at which the GPU is located. Should the fault detection unit determine that the processed task written out to external memory (or in a cache for writing to external memory) is invalid then the graphics processing system may be configured to cause the processed task to be discarded and/or marked as invalid. The output of the last processing unit to process a task may be written out to external memory with the output of earlier processing units being discarded. This can have the advantage that once the output of the last processing unit is known, all of the signatures are available for comparison at the fault detection unit. This can avoid unnecessarily consuming memory bandwidth by writing out invalid data. In general, all or any one or more of the outputs from processing units arranged to process a given task may be written out to memory 201.

A graphics processing system configured in accordance with the principles described herein may be operable to process both (a) safety tasks which are tasks which relate to safety-critical functions and (b) regular tasks which do not relate to safety-critical functions and which therefore do not need repeat processing. This arrangement is possible in the graphics processing systems described herein because each processing unit of the system may be allocated to process any given task independently of any other processing unit, allowing different processing units to process different tasks. Furthermore, each instance of a particular task may be independently allocated to a processing unit of the system. Both safety tasks and regular tasks may be concurrently processed at different processing units of the system. A regular task received for processing 715 at the graphics processing system may be processed 716 at a processing unit in the conventional manner and written out to memory 717 without any checking of the processed output from the processing unit allocated the regular task.

A graphics processing system as described herein provides a significant advantage over conventional lockstep processors where both processing cores of the lockstep processor must necessarily both process the same task, even if that task does not relate to a safety-critical function. Lockstep processors suffer from the problem that its two (or more) cores are locked together and cannot be individually utilised, leading to an inflexible 100% chip area cost in respect of every task processed.

As appropriate to the architecture of the graphics processing system, safety tasks could be identified by means of a flag. For example, tasks submitted to the graphics processing system by a data processing system at which the GPU is provided may be marked with a flag so as to cause the graphics processing system to repeat processing of those tasks in accordance with the principles described herein. It will be appreciated that safety tasks could be identified in many different ways, including, for example, by means of a register, list or other dataset identifying which tasks are safety tasks. Tasks could be allocated a unique identifier to allow them to be unambiguously identified.

In some examples, on receiving a task identified as a safety task, the demultiplexer 402 may in response allocate the task to multiple processing units for processing at those units. On identifying processed data relating to a safety task, the arbitration unit 401 may be configured to, in response, route that processed data to the check unit so as to cause a signature to be generated in respect of the processed data. The arbitration unit may be configured to cause to be written out to memory 201 one or more of the outputs from processing units in respect of the safety task (e.g. by causing that/those outputs to be written to cache 206). A flag identifying a safety task could be passed through to the processed data output by a processing unit in respect of that task (or another flag may be provided in respect of such processed data).

Regular tasks do not require repeat processing because the GPU does not need to meet a predefined safety level when processing those tasks. Such regular tasks may be allocated to a single processing unit for processing and the processed data output from that processing unit is written out to memory. It is advantageous if signatures are not formed for processed regular tasks. This can avoid unnecessary power consumption at the GPU. In some examples, a different subset of one or more processing units may be allocated for processing regular tasks: the subset of processing units may be exclusively used for processing regular tasks; the other processing units of the plurality of process units may be exclusively used for processing safety tasks. This can help isolate safety tasks from errors, data corruption and security issues which could be caused by regular tasks running at the same processing unit.

Allowing the repeat processing of a task to be performed at any processing unit of the graphics processing system provides protection against transient events. However, it is possible for processing units to develop permanent faults which can allow a processing unit to provide an invalid output each time it processes a given task. In the approach illustrated in FIG. 4 the processing of a task may be repeated at the same processing unit and hence this approach may not detect permanent faults.

Workload Repetition at Different Processing Units

Figure 5:
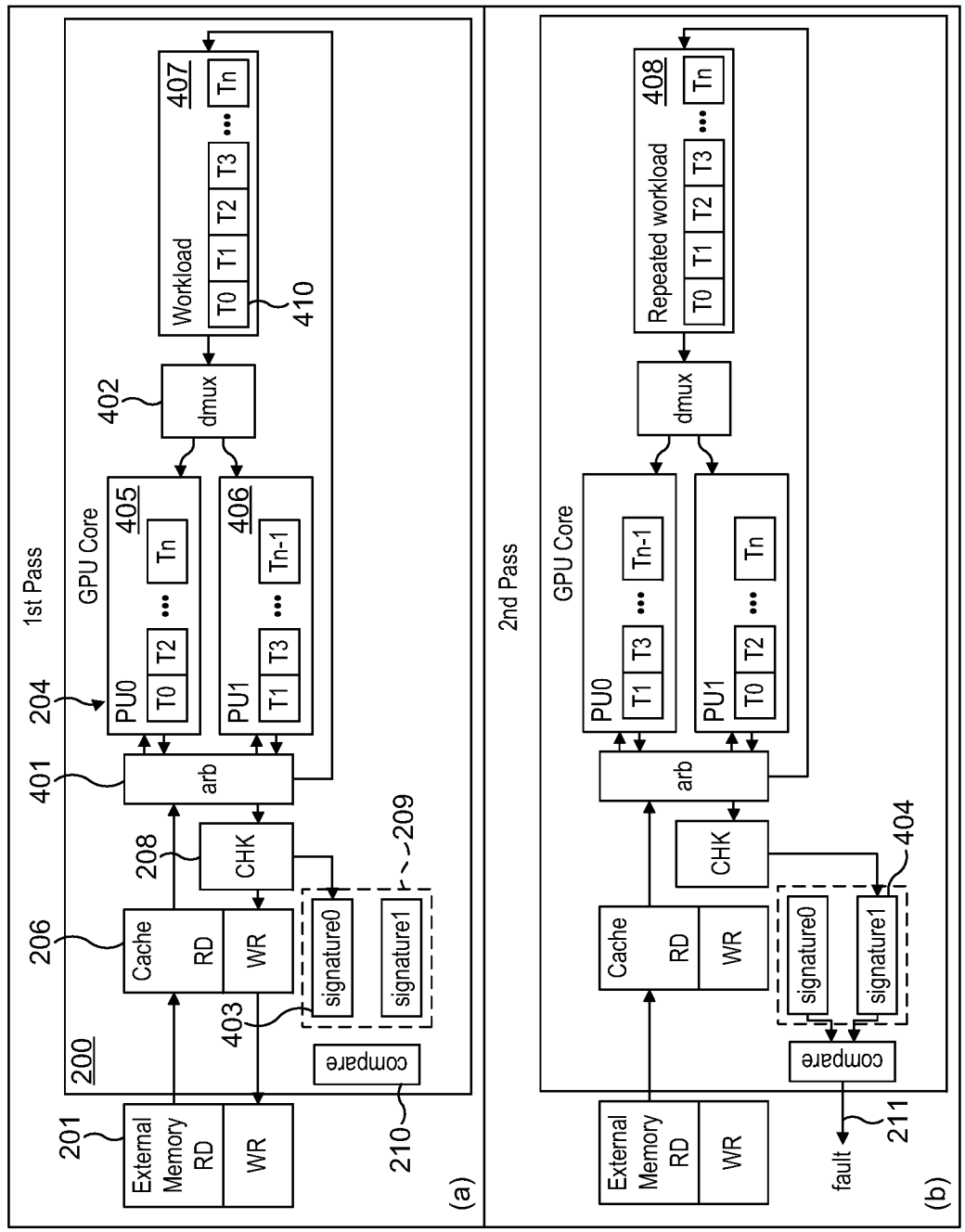
FIG. 5 is a schematic diagram illustrating the operation of a graphics processing system according to a second example.

In order to improve the safety characteristics of the GPU, it can be advantageous to ensure that each safety task is processed at two or more different processing units. This approach is illustrated in the example shown in FIG. 5 with an exemplary flowchart for the approach again being shown in FIG. 8. The system shown in FIG. 5 operates similarly to the system shown in FIG. 4 described above, but in the system shown in FIG. 5, it is ensured that a safety task which is allocated to processing unit 405 in the first pass shown in FIG. 5(a) is allocated to processing unit 406 in the second pass shown in FIG. 5(b), and vice versa. For instance, tasks T0 and T2 are processed at processing unit 405 in the first pass but at processing unit 406 in the second pass, and tasks T1 and T3 are processed at processing unit 406 in the first pass but at processing unit 405 in the second pass.

The check unit 208 is configured as described above to form a signature which is characteristic of the output from each processing unit in respect of each safety task. The fault detection unit 210 is configured as described above to compare two or more signatures (as appropriate to the number of times processing of a task is repeated) characteristic of the output from different processing units arranged to process the same task and to raise a fault detection signal 211 if those signatures do not match.

In some examples, the graphics processing system would comprise a plurality of more than two processing units. In general, a given safety task may be processed at any two or more different processing units of the plurality of processing units. This may be achieved in any suitable manner. For example, a first instance of a task may be allocated to any of the processing units and a second instance of a task allocated to any processing units other than the processing unit to which the first instance of the task is allocated. Further instances of a task (e.g. in systems configured to process safety tasks more than twice) may be handled in the same manner—e.g. with further instances of a task being allocated to any processing unit at which that task has not already been processed. Such allocation may be performed by, for example, demultiplexer 402 in FIG. 5. By allowing tasks to be dynamically allocated to any available processing units which have not previously processed the task, the processing units of a graphics processing system can be efficiently utilised.

In order to know to which processing units a task has previously been allocated, a log (e.g. a lookup table) may be maintained at the graphics processing system (e.g. in a data store accessible to the demultiplexer 402) identifying which processing units each task has been allocated to. Each task may include an identifier such that each task may be uniquely referenced in the log. Each task may include an identifier (e.g. a flag) indicating whether the task has previously been allocated to a processing unit and/or how many times the task has previously been allocated to a processing unit. For example, each task may initially have a flag set (e.g. a state bit in a control stream) to indicate that the task has not yet been allocated to a processing unit and is due for first pass processing. On being allocated to a processing unit on the first pass, the flag may be cleared in the task held at the workload (e.g. in the cache) to indicate that the task is available for processing on its second pass.

On allocating a task to a processing unit on a second or subsequent pass, a log may be consulted which identifies the processing unit(s) the task has been allocated to. In response the task may be allocated to any other processing unit. The lookup of the task in the log may or may not be in response to the flag indicating that the task has previously been allocated. In some examples, an identifier of the processing unit(s) a task has previously been allocated to may be written to or otherwise associated with the task at the data store holding the workload (e.g. cache 206). This avoids the need for a separate lookup into a log in order to identify to which processing unit(s) at task has previously been allocated.

In some examples the allocation of tasks to processing units is performed by the processing units themselves. For example, each processing unit may request or otherwise retrieve work from the workload (e.g. at cache 206) as and when processing capacity becomes available at the processing unit (e.g. when the processing unit can receive a task into its pipeline). Each processing unit may perform any of the approaches described herein for determining whether a task has previously been processed at the processing unit. For example, a processing unit may read a flag at a next available task in the workload to determine whether the task has previously been processed. When the flag indicates the task has previously been processed, the processing unit determines whether it processed the task (e.g. by means of a lookup into a log) and: if it did process the task, skips that task and does not process it; if it did not process the task, the processing unit proceeds to process the task.

In some examples, tasks in the workload may be at least logically arranged into input buffers for each processing unit. On being allocated to a first processing unit, the graphics processing system (e.g. demultiplexer 402) may be configured to add the task to the input buffer for a different processing unit. This approach can enable each processing unit to work through the tasks in its respective input buffer without the graphics processing system at that point needing to check whether a processing unit has previously processed that task.

In some examples, processing units may be logically arranged in groups of two or more processing units, with a given task of a workload being allocated to the processing units of that group. Different tasks may be allocated to different groups of processing units for initial and repeat processing. For example, a group may comprise a pair of processing units and the graphics processing system may be configured to process safety tasks twice, and a given task may be allocated to that pair of processing units for initial and repeat processing. In the example shown in FIG. 5 for instance, the demultiplexer 402 may be configured to allocate each task of the workload to the pair of processing units 405 and 406. Each processing unit may then process that task in due course (e.g. once it has completed processing its current task). In some examples, the tasks of a workload may be numbered and tasks are allocated to processing units based on their number. For example, in the example shown in FIG. 5, in the first pass, even-numbered tasks may be allocated to processing unit 405 and odd-numbered tasks may be allocated to processing unit 406; on repeating processing of the tasks in the second pass the allocation is reversed, with even-numbered tasks being allocated to processing unit 406 and odd-numbered tasks may be allocated to processing unit 405. A graphics processing system may comprise a plurality of groups of processing units, each arranged to process different workloads of tasks.

Allocating a task to a processing unit may comprise adding the task to a queue of tasks for processing at the processing unit.

The approach described herein with respect to FIG. 5 has the advantage that it guarantees that at least two different processing units will process each safety task. This allows permanent faults at processing units to be detected as well as transient events since it avoids the possibility that processing of a given task will be repeated at the same processing unit.

Workload Repetition with Read-Back

Whilst the approaches described herein with respect to FIGS. 4 and 5 enable faults to be detected at the processing units of a graphics processing system, they do not provide protection over hardware on the data path after the processing units. For example, faults introduced at cache 206 or memory 201 would not be identified. Data correction mechanisms such as Error Correcting Codes (ECC) can provide some ability to recover from minor errors in caches and memories, such as the flipping of single bits. Error detection mechanisms such as parity bits may be employed in caches and/or memories. However, such mechanisms cover data but not control messages communicated to/from the GPU.

It can be advantageous to perform a check on processed task data on the data path subsequent to one or more caches and/or memories to which the processed task data is written (e.g. for use at processes executing at a data processing system at which the GPU is supported). This enables the verification of the content of caches and/or memories in order to help ensure that the processed task data available for use (e.g. at a data processing system comprising the GPU) is the same valid processed data generated at a processing unit.

Figure 6:
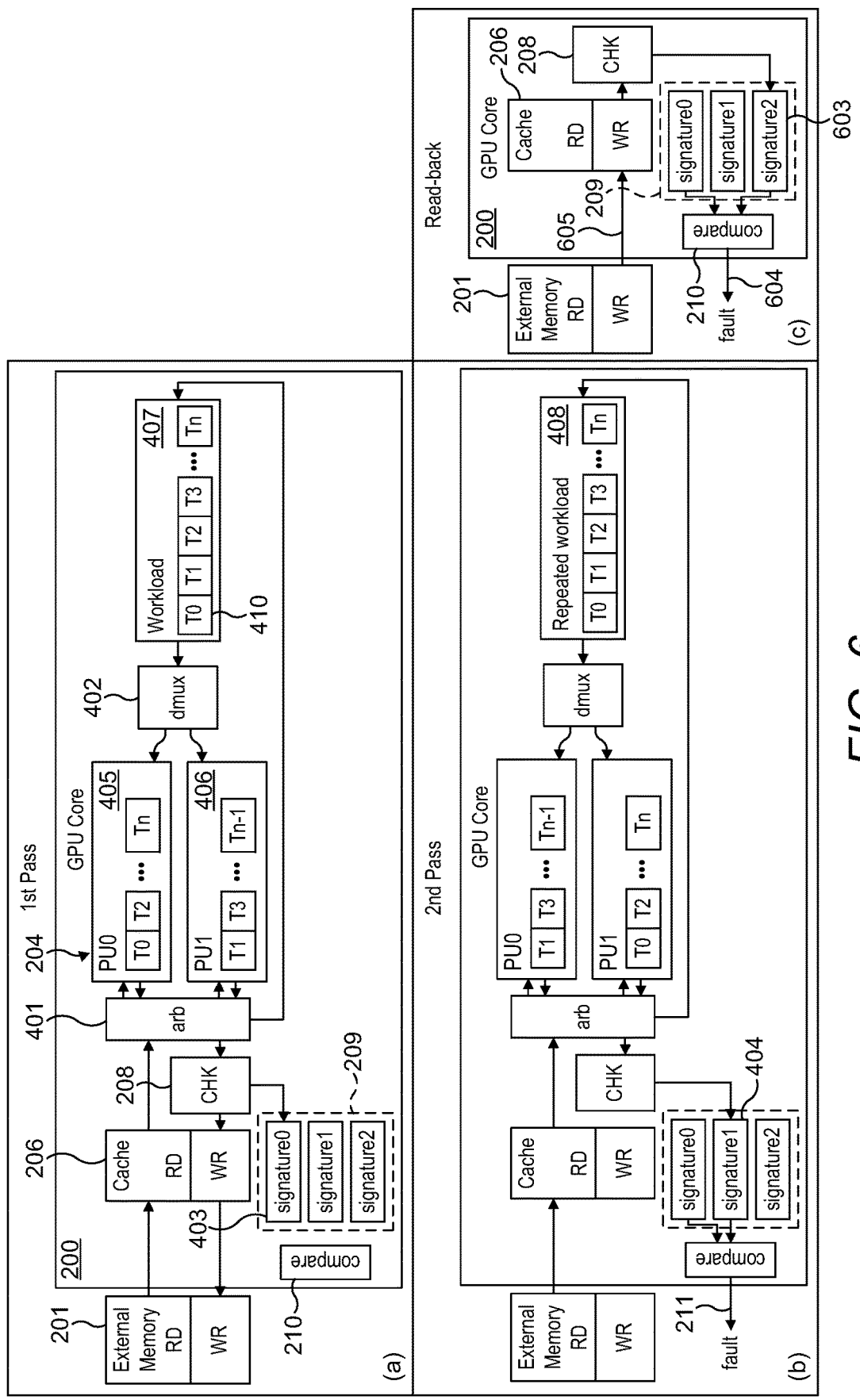
FIG. 6 is a schematic diagram illustrating the operation of a graphics processing system according to a third example.

An example of an arrangement for checking a cache and memory is shown schematically in FIG. 6 and will be described again with reference to the flowchart shown in FIG. 8. In FIGS. 6 (a) and (b), the first and second processing passes of tasks are shown as being performed in the same manner as described with respect to FIGS. 5 (a) and (b). The first and second processing passes of tasks could be performed in the same manner as described with respect to FIGS. 4 (a) and (b). More generally the processing of tasks and the checking of the output from the processing units of the GPU may be performed in accordance with any of the principles described herein.

FIG. 6(c) schematically illustrates read-back checking performed on the processed task data written out to memory 201. In the figure, processed task data which has been written out 710 to memory 201 is read back 605, 711 from the memory 201 into cache 206. In general, processed task data in respect of each safety task may be read back into any data store accessible to the check unit 208, or streamed directly to the check unit 208. The processed task data read back from memory 201 to cache 206 is operated on by check unit 208 so as to form 712 a signature 603 which is characteristic of the processed task data. The check unit is configured to store 713 at data store 209 one or both of the signatures 403, 404 formed for the output of processing units 405 and 406 in respect of each task. The instance of the check unit 208 which is configured to form the signature for processed task data read back from memory may be a different instance to the instance of the check unit 208 which is configured to form the signature on each pass of a task through a processing unit. In some examples, the same check unit instance is used so as to minimise the size of the GPU. In other examples, different check unit instances are used so as to maximise the fault detection capability of the system.

In general, the check unit may be configured to store for each safety task one or more of the signatures of the outputs of the processing units arranged to process that task. When the signatures characteristic of the output from processing units arranged to process a safety task do match, it might be the case that only one of the signatures is stored so as to avoid unnecessarily storing duplicate data. A signature may not be stored if the signatures characteristic of the output from processing units arranged to process a safety task do not match. For example, when signatures do not match, the signatures may be discarded and the processed task data may be discarded. This avoids consuming memory bandwidth in unnecessarily writing out invalid processed task data.

In the example shown in FIG. 6(c), fault detection unit 210 is configured to compare 714 the signature 603 formed in respect of the processed task data read back from memory with the stored signature 403/404 characteristic of that processed task data at the point it was output from a processing unit. The processed data corresponding to a particular task may be identified in any suitable manner. For example, each task may be associated with an identifier and that same identifier may be associated with each processed task output by a processing unit. The same identifier may be associated with each signature formed for a processed task in respect of that same task. In this manner, the tasks, processed tasks and signatures may be readily identified at the graphics processing system. In other examples, tasks, processed tasks and their signatures may use any combination of two or more different identifiers and a data structure (e.g. a lookup table) may be provided which identifies the correspondence between tasks, the processed task data for those tasks, and the signatures for the processed tasks.

If the signatures 603 and 403/404 do not match 708, the fault detection unit 210 is configured to raise a fault signal 604. Fault signal 604 may have any of the characteristics of fault signal 211 described herein with reference to FIGS. 4 and 5. Fault signal 604 may or may not differ from fault signal 211. The fault signal 604 may be raised in respect of a particular task—for example, the fault signal may identify which task the fault is in respect of. A data processing system at which the GPU 200 is provided may use the fault signal in any manner as appropriate to the application. For example, on receiving a fault signal in respect of a task the data processing system may cause all processed data relating to the task to be flushed from memory 201 and/or cache 206. The data processing system may cause the task to be resubmitted to the processor. Such resubmitted tasks could be assigned a high priority so as to be processed as quickly as possible at the GPU.

Figure 7:
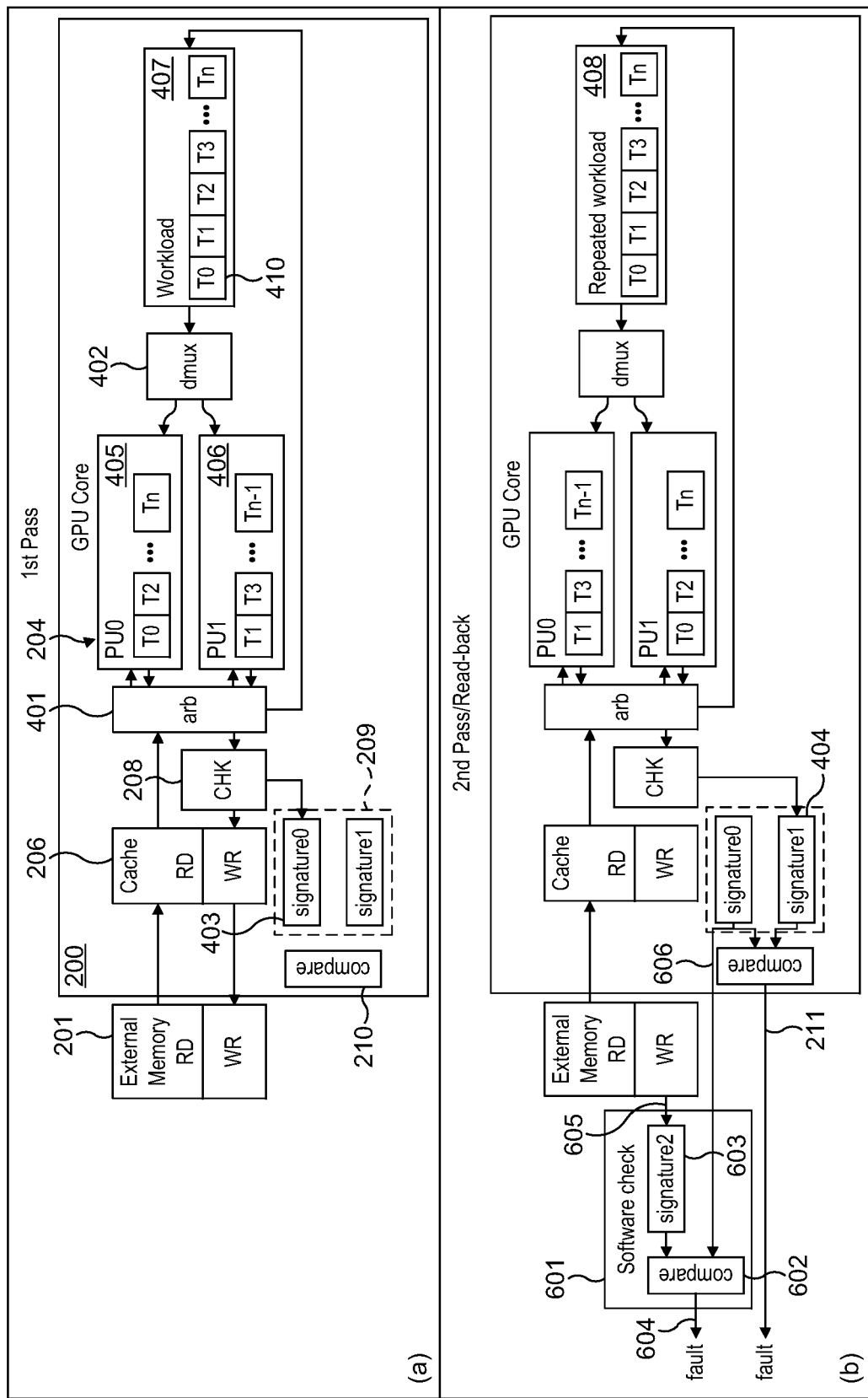
FIG. 7 is a schematic diagram illustrating the operation of a graphics processing system according to a fourth example.

In some examples, fault checking of the memory may be performed outside the GPU and the check unit 208 may be configured to make available at least some of the signatures it generates in respect of processed tasks to systems at which the GPU is supported. For example, FIG. 7 illustrates an arrangement in which fault checking is performed in software. In the system shown in FIG. 7, the first and second passes may be performed as for the system shown in FIG. 6 in accordance with any of the principles set out herein. FIG. 7(*b*) additionally shows how fault checking in software may be performed. A software check unit 601 is configured to read back 605, 711 processed task data from memory 201 and form 712 a signature 603 characteristic of that processed data. The software check unit 601 is configured to perform the same check calculations as check unit 208 so as to enable comparison of the signatures it generates with the signatures formed at check unit 208.

The check unit 208 is configured to make available 606 signatures stored at data store 209 which have been formed in respect of tasks processed in the first and second passes at the processing units 204. For example, the check unit could write out signatures to memory 201. A signature formed in respect of a given task may be written out to memory in response to the fault detection unit determining that the outputs match from the processing unit(s) configured to process that task on different passes. A signature formed in respect of a given task may be written out to memory along with the processed data itself. In general, the graphics processing system is configured to make available 713, in respect of each safety task, at least one of the signatures formed by the check unit on the output(s) of the processing unit(s) on processing that task. Signatures may be made available in any suitable manner—for example, by one or more of writing signatures out to memory, storing signatures in a data store at the GPU which is accessible to software, and writing signatures to a data store external to the GPU.

A software fault detection unit 602 is configured to compare 714 one or more of the signature(s) (e.g. 403, 404) made available by the check unit 208 to the signature 603 formed by software check unit 601. If the signatures do not match 708, a fault signal 604 is raised indicating data corruption at some point on the data path between the output of the processing unit and the output of the memory which includes cache 206 and memory 201. The fault signal 604 may have any of the characteristics of fault signal 211 described herein with reference to FIGS. 4, 5 and 6.

The software check unit 601 may be supported in any suitable software environment, including, for example, at a software environment of a data processing system at which the GPU is supported (e.g. software environment 301 at data processing system 300 in FIG. 3), and/or at a software environment provided by the GPU itself. The software check unit may be provided, for example, at one or more of: a driver of the GPU (e.g. 309 in FIG. 3); at an operating system (e.g. 306 in FIG. 3); and at a process (e.g. 307 in FIG. 3). The software check unit 601 may be provided in any combination of software and/or firmware.

In general, a check unit configured to form a signature for processed task data read from memory and/or a fault detection unit for comparing that signature to a corresponding signature generated at the GPU in respect of a given task may be located anywhere at the graphics processing system—e.g. at the GPU or at a data processing system at which the GPU is supported. For example, a check unit and/or fault detection unit may be provided in hardware at the data processing system and arranged to receive processed task data from memory 201 and signatures from the GPU.

Arranging for processed task data to be read back from memory consumes memory bandwidth but can allow a graphics processing system to achieve a higher safety level by additionally enabling faults to be detected at the memory and any preceding caches on the data path from the GPU to the memory.

Asymmetric Approach

As described above, in some examples, the processed task data generated on the first pass of a safety task through the GPU is written out to memory 201 and this processed task data of that first pass is read-back to a check unit (e.g. check unit 208 or software check unit 601) for formation of its respective signature 603. Since the processed task data generated on the first pass would typically be available first, this allows a signature to be available as early as possible for the processed task data held at the memory. A second processing pass of the task through the GPU may overlap in time with the processed task data from the first pass being written out to memory and/or the processed task data from the first pass being read-back from memory and/or a signature being formed for the processed task data from the first pass.

Figure 9:
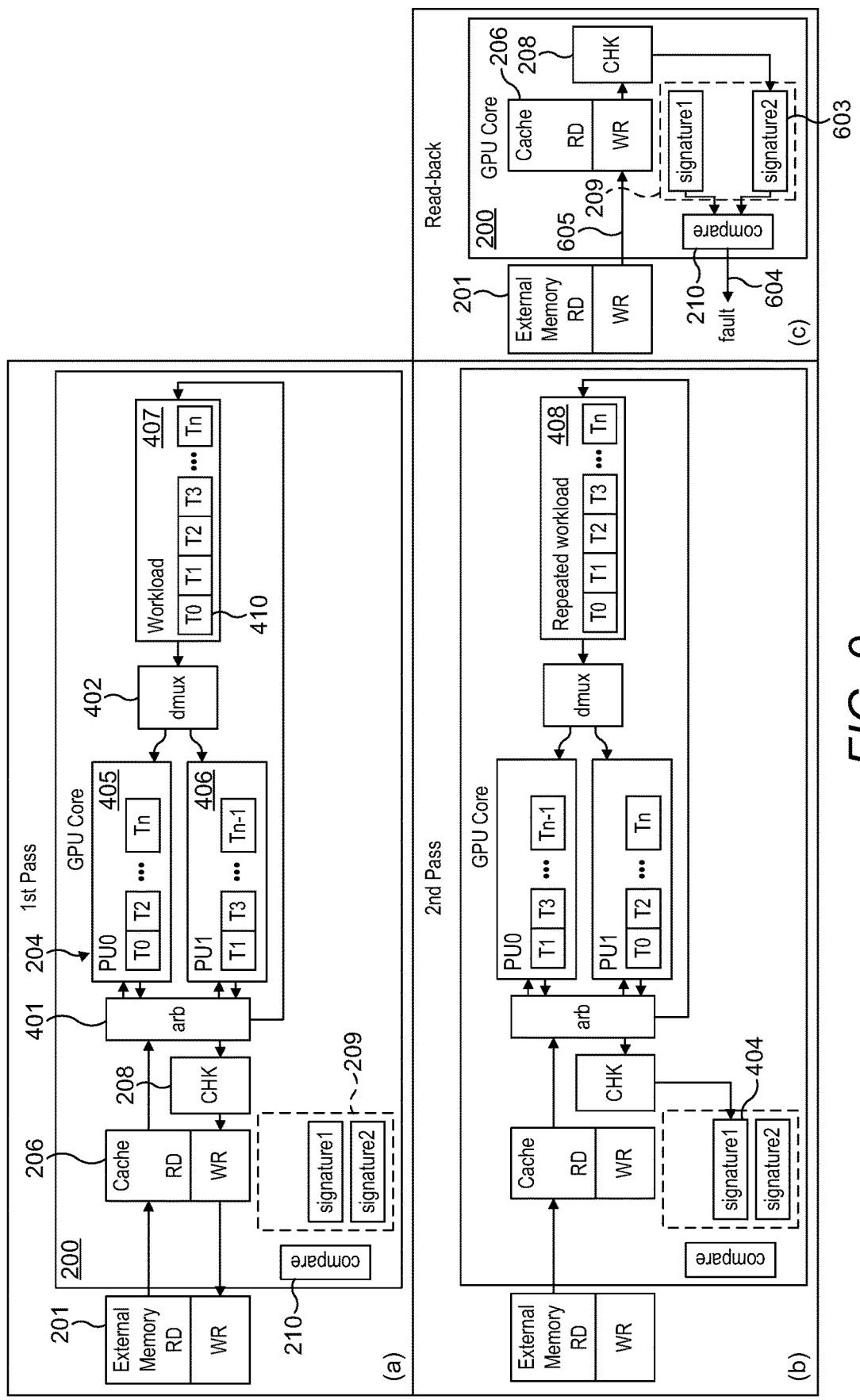
FIG. 9 is a schematic diagram illustrating the operation of a graphics processing system according to a fifth example.
Figure 11:
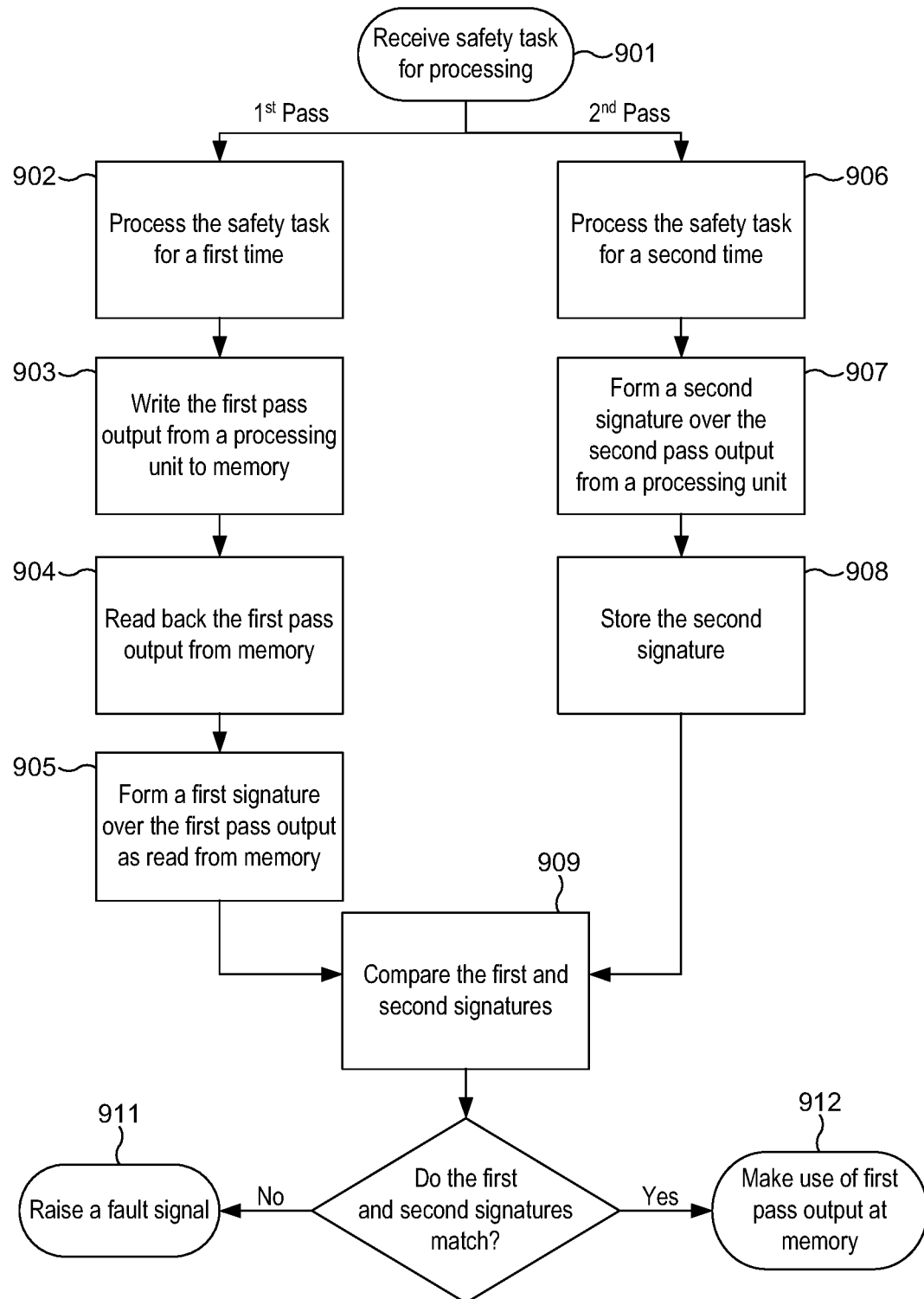
FIG. 11 is a flowchart illustrating the operation of a graphics processing system configured in accordance with the principles described herein.

Furthermore, the graphics processing system may be configured to not form a signature in respect of the processed task data from the first pass prior to that data being written out to memory. This is illustrated in FIG. 9 and the flowchart of FIG. 11. A safety task is received for processing at the graphics processing system 901. On performing a first pass of the safety task 902 at a processing unit (e.g. task T0 is processed at processing unit 405 in FIG. 9(*a*)) the check unit 208 is arranged not to form a signature for the processed data output by that processing unit in respect of that task at that time. Instead the processed task data from the first pass is written out 903 to memory 201 via cache 206. When the task is processed for a second time 906 at the GPU (e.g. task T0 is processed in a second pass at processing unit 406 in FIG. 9(*b*)) a signature 404 is generated 907 at the check unit 208 in accordance with any of the principles described herein with respect to FIGS. 2 to 7. The signature 404 from that subsequent pass may be stored 908 at data store 209. Since a signature may not yet be available in respect of the first pass, no comparison is shown in FIG. 9(*b*) as being performed and no fault signal raised.

The processed task data for the second pass might not be written out to memory so as to minimise the bandwidth consumed between the GPU and memory. The signature for the second pass may be formed prior to the processed task data for the second pass being written to the cache. In some examples, if the processed task data for the second pass is not written to cache so as to minimise the size of the cache required, and it (writing the processed task data for the second pass to the cache) may be unnecessary if that processed data is not to be written out to memory.

The processed task data from the first pass is read-back 904 from the memory for a further check to be performed. This process is illustrated in FIG. 9(*c*) in which processed task data is read-back 605 for a signature to be formed 905 at check unit 208. In the example shown in FIG. 9(*c*) the processed data is read-back to the cache 206 but in general the read-back may be to any data store at the GPU and/or streamed to the check unit 208 without non-transient storage of the processed data at a data store of the GPU. The check unit 208 is configured to receive the read-back processed task data from the first pass and generate a signature 603 which is characteristic of that data. Since the processed task data has been written out to memory 201 and read-back prior to its reception at the check unit, the signature 603 captures faults which occur in the processing of the task at the processing unit which performs the first pass as well as faults which occur in memory 201, cache 206 and along the data paths to and from those data stores (e.g. over an interconnect between GPU 200 and memory 201).

The fault detection unit 210 is configured to compare 909 the signature 404 characteristic of the second pass of the task through the GPU to signature 603 characteristic of the first pass of the task through the GPU and as stored at memory 201. If the two signatures do not match 911, the fault detection unit 210 may raise a fault signal 604. The signatures would not match if the output of the two processing units differed and/or data corruption had occurred at or between the cache and/or memory. The fault signal 604 is therefore representative of faults at both the processing units of the GPU and the cache and/or memory. If the two signatures match 912, the processed task data generated on the first pass and available at the memory 201 may be considered valid and used in the manner appropriate to the application (e.g. in an automotive context, the processed task data may represent graphical data for writing to an instrument console).

In the example shown in FIG. 9(c), the fault checking of processed data read-back from memory 201 is performed at the GPU. In other examples, fault checking of the memory may be performed at a further check unit outside the GPU and the check unit 208 may be configured to make available to that further check unit the signature formed in respect of processed data from the second pass. A check unit for receiving processed data read-back from memory may be arranged in accordance with any of the ways described herein with respect to FIGS. 6 and 7. For example, a software check unit may be provided in the manner shown in FIG. 7, with the GPU 200 being configured to provide to the software check unit the signature 404 from the second pass, wherein the software check unit is configured to raise the fault signal 604 should that signature from the second pass not match the signature of the processed data of the first pass read-back from the memory. If the fault checking is performed outside the GPU, the GPU might not include a fault detection unit 210 and might not raise a fault signal. Note that the data store 209 in FIG. 9 is schematic and the GPU might not include a data store for holding signatures generated at the check unit 208. For example, the check unit may be configured to write out to memory the signatures it generates in respect of each second pass of the tasks processed at the GPU.

The asymmetric approach of forming a signature on the second pass over the output from the respective processing unit whilst forming a signature of the first pass over the output from the respective processing unit and the memory to which that output is written has several advantages. Firstly, only two signatures need to be formed in order to capture faults both at the processing units and the memory. This reduces the processing required at the GPU (and potentially other systems), reduces the power consumption of the GPU, and reduces the size of data storage required at the GPU to store signatures formed at the check unit. Secondly, the asymmetric approach minimises the memory write bandwidth since only the first processed output from the GPU need be written out to memory—there is no need to write out data from the second pass to memory. Thirdly, the asymmetric approach minimises the time until a fault signal is available because the processed output from the first pass may be written out to memory as soon as it is available without waiting for the result of the second pass in order for the signatures of the first and second passes to be compared and the output of the first pass validated.

In short, the asymmetric approach enables the maximum chip area to be covered (processing units+cache+memory) at minimum cost in terms of processing, power consumption and chip area.

In the examples shown in FIGS. 6, 7 and 9, the processed task data is read back from memory. In some examples, the processed task data may be read back from the cache so as to detect faults in the cache. This may be instead of or in addition to reading back the processed task data from the memory. Reading back from the cache instead of from memory can have the advantage that it avoids consuming bandwidth between the GPU and memory, although at the expense of not providing protection over the memory. In order to minimise reads from the cache, processed task data may be directed to the check unit 208 on being read out from the cache 206 to memory 201 such that both the memory 201 and the check unit 208 receive the processed task data.

By checking that the processed task data output by a processing unit is the same processed task data read out from memory and/or cache, a greater degree of protection against data faults may be provided. This may allow a higher safety level to be achieved. When used in an automotive context, graphics processing systems configured in accordance with the principles described herein can achieve at least ASIL level B. By combining the graphics processing systems taught herein with conventional error recovery and fault detection mechanisms, ASIL level D can be achieved. For example, memory 201 and/or cache 206 could be ECC memories to allow recovery from minor errors and improve the robustness of the graphics processing system to transient events.

A graphics processing system configured in accordance with the principles described herein may be configured to process both safety tasks which relate to safety-critical functions and regular tasks which do not relate to safety-critical functions. Because each task and each instance of a task may be allocated to a processing unit of the system independently from any other task or instance of a task (subject to any constraint that a processing unit should not be re-used for the same task), the graphics processing system may redundantly process safety tasks according to the required safety level whilst also processing regular tasks in a single pass without conforming to that safety level. In some examples, a subset of the processing units of the graphics processing system are reserved for processing safety tasks such that safety tasks and regular tasks are processed at different processing units. The advantages described herein follow whether or not safety tasks and regular tasks are configured to be processed to different sets of processors. Compared to lockstep processors which are bound to process every task allocated to them at least twice, this approach reduces power consumption, reduces on-chip data bandwidth, and reduces the size of the GPU needed in order to provide a given processing performance since it avoids wasting chip area in order to provide a dedicated safety core when that safety core is not always required.

The graphics processing systems and data processing systems of FIGS. 2 to 7, 9 and 10 are shown as comprising a number of functional blocks. This is schematic only and is not intended to define a strict division between different logic elements of such entities. Each functional block may be provided in any suitable manner. It is to be understood that intermediate values described herein as being formed by graphics processing systems need not be physically generated by the graphics processing systems at any point and may merely represent logical values which conveniently describe the processing performed by a graphics processing system between its input and output.

A graphics processing unit described herein may be embodied in hardware on an integrated circuit. The graphics processing systems described herein may be configured to perform any of the methods described herein.

The terms computer program code and computer readable instructions as used herein refer to any kind of executable code for processors, including code expressed in a machine language, an interpreted language or a scripting language. Executable code includes binary code, machine code, bytecode, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

A processor, computer, or computer system may be any kind of device, machine or dedicated circuit, or collection or portion thereof, with processing capability such that it can execute instructions. A processor may be any kind of general purpose or dedicated processor, such as a CPU, GPU, vector processor, tensor processor, System-on-chip, state machine, media processor, an application-specific integrated circuit (ASIC), a programmable logic array, a field-programmable gate array (FPGA), or the like. A computer or computer system may comprise one or more processors.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed in an integrated circuit manufacturing system configures the system to manufacture a graphics processing unit configured to perform any of the methods described herein, or to manufacture a graphics processing unit comprising any apparatus described herein. An integrated circuit definition dataset may be, for example, an integrated circuit description.

There may be provided a method of manufacturing, at an integrated circuit manufacturing system, a graphics processing unit as described herein. There may be provided an integrated circuit definition dataset that, when processed in an integrated circuit manufacturing system, causes the method of manufacturing a graphics processing unit to be performed.

An integrated circuit definition dataset may be in the form of computer code, for example as a netlist, code for configuring a programmable chip, as a hardware description language defining an integrated circuit at any level, including as register transfer level (RTL) code, as high-level circuit representations such as Verilog or VHDL, and as low-level circuit representations such as OASIS® and GDSII. Higher level representations which logically define an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture a graphics processing unit will now be described with respect to FIG. 10.

Figure 10:
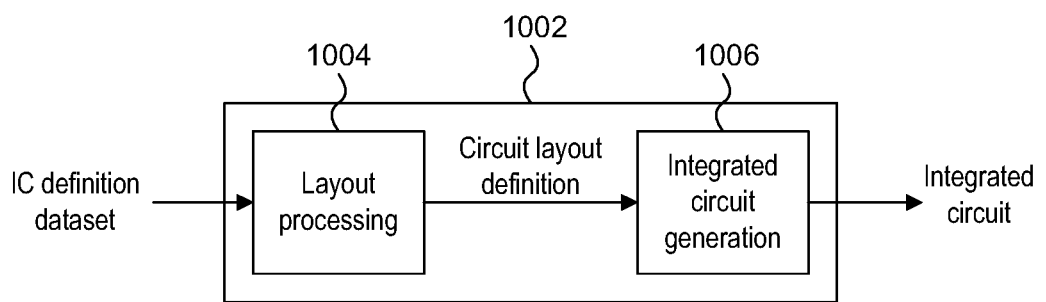
FIG. 10 is a schematic diagram of an integrated circuit manufacturing system.

FIG. 10 shows an example of an integrated circuit (IC) manufacturing system 1002 which is configured to manufacture a graphics processing unit as described in any of the examples herein. In particular, the IC manufacturing system 1002 comprises a layout processing system 1004 and an integrated circuit generation system 1006. The IC manufacturing system 1002 is configured to receive an IC definition dataset (e.g. defining a graphics processing unit as described in any of the examples herein), process the IC definition dataset, and generate an IC according to the IC definition dataset (e.g. which embodies a graphics processing unit as described in any of the examples herein). The processing of the IC definition dataset configures the IC manufacturing system 1002 to manufacture an integrated circuit embodying a graphics processing unit as described in any of the examples herein.

The layout processing system 1004 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 1004 has determined the circuit layout it may output a circuit layout definition to the IC generation system 1006. A circuit layout definition may be, for example, a circuit layout description.

The IC generation system 1006 generates an IC according to the circuit layout definition, as is known in the art. For example, the IC generation system 1006 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 1006 may be in the form of computer-readable code which the IC generation system 1006 can use to form a suitable mask for use in generating an IC.

The different processes performed by the IC manufacturing system 1002 may be implemented all in one location, e.g. by one party. Alternatively, the IC manufacturing system 1002 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture a graphics processing unit without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 10 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 10, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

The implementation of concepts set forth in this application in devices, apparatus, modules, and/or systems (as well as in methods implemented herein) may give rise to performance improvements when compared with known implementations. The performance improvements may include one or more of increased computational performance, reduced latency, increased throughput, and/or reduced power consumption. During manufacture of such devices, apparatus, modules, and systems (e.g. in integrated circuits) performance improvements can be traded-off against the physical implementation, thereby improving the method of manufacture. For example, a performance improvement may be traded against layout area, thereby matching the performance of a known implementation but using less silicon. This may be done, for example, by reusing functional blocks in a serialised fashion or sharing functional blocks between elements of the devices, apparatus, modules and/or systems. Conversely, concepts set forth in this application that give rise to improvements in the physical implementation of the devices, apparatus, modules, and systems (such as reduced silicon area) may be traded for improved performance. This may be done, for example, by manufacturing multiple instances of a module within a predefined area budget.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

What is claimed is:

1. A graphics processing system comprising:
a plurality of processing units for processing tasks, each processing unit being configured to process a task independently from any other processing unit of the plurality of processing units;
a check unit operable to form a signature which is characteristic of an output of a processing unit on processing a task; and
a fault detection unit operable to compare signatures formed at the check unit;
wherein the graphics processing system is configured to process each task of a first type first and second times at the plurality of processing units so as to, respectively, generate first and second processed outputs, wherein the check unit is configured to form first and second signatures which are characteristic of, respectively, the first and second processed outputs, and wherein the fault detection unit is configured to compare the first and second signatures and raise a fault signal if the first and second signatures do not match; and
wherein each task of a second type is processed only a first time at the plurality of processing units so as to generate a respective single processed output.

2. The graphics processing system as claimed in claim 1, wherein the graphics processing system is configured to concurrently process tasks of the first and second type at different processing units of the graphics processing system.

3. The graphics processing system as claimed in claim 1, wherein each task of the second type is a non-safety task which is not to be processed according to a predefined safety level.

4. The graphics processing system as claimed in claim 1, wherein the check unit is configured to not form a signature which is characteristic of the single processed output.

5. The graphics processing system as claimed in claim 1, further comprising one or more other processing units configured to process tasks of a second type, the one or more other processing units being configured to process each task of the second type only a first time.

6. The graphics processing system as claimed in claim 1, wherein each task of the first type is a safety task which is to be processed according to a predefined safety level.

7. The graphics processing system as claimed in claim 1, wherein a first processing unit of the plurality of processing units is configured to process a task of the first type on the first time of processing, and a second processing unit of the plurality of processing units is configured to process that task of the first type on the second time of processing.

8. The graphics processing system as claimed in claim 7, wherein the graphics processing system is configured such that the second processing unit receives that task of the first type independently to the first processing unit.

9. The graphics processing system as claimed in claim 7, wherein the graphics processing system is configured such that the second processing unit is constrained to be any processing unit of the plurality of processing units other than the first processing unit.

10. The graphics processing system as claimed in claim 7, wherein the graphics processing system is configured such that the first and second processing units are permitted to be the same processing unit.

11. The graphics processing system as claimed in claim 7, wherein the graphics processing system includes an allocation unit configured to allocate tasks of the first type to the first and second processing units.

12. The graphics processing system as claimed in claim 1, further comprising a cache for holding tasks of the first type for processing at the plurality of processing units, wherein a task of the first type is not removed from the cache when a processing unit retrieves that task for processing for a first time.

13. The graphics processing system as claimed in claim 1, wherein each task of the first type includes an identifier having a least two states: an initial state indicating that a task of the first type has not been processed fora first time, and a second state indicating that a task of the first type has been processed for a first time, and wherein each processing unit of the plurality of processing units is configured to, on processing a task of the first type for a first time, update the identifier from the initial state to the second state.

14. The graphics processing system as claimed in claim 13, wherein a processing unit of the plurality of processing units is configured to, on accessing a cache of tasks of the first type at the graphics processing system, retrieve a task of a first type having an identifier in the second state only if that processing unit did not process that task when processed for a first time.

15. The graphics processing system as claimed in claim 1, wherein the check unit is configured to store the first signature formed in respect of the first processed output for subsequent use by the fault detection unit on comparing the first signature to the second signature.

16. The graphics processing system as claimed in claim 1, further comprising a data store to which the graphics processing system is configured to write one or more processed outputs in respect of each task of the first type, wherein the graphics processing system is configured to write only one of the first and second processed outputs to the data store.

17. The graphics processing system as claimed in claim 16, wherein the check unit is configured to read back processed data written to the data store in respect of a task of the first type so as to generate a further signature which is characteristic of that processed data held at the data store, and the fault detection unit is configured to compare the further signature to one or both of the first and second signatures generated by the check unit in respect of that task of the first type, the fault detection unit being configured to raise a fault signal if the further signature does not match one or both of the first and second signatures.

18. The graphics processing system as claimed in claim 16, wherein the plurality of processing units, check unit and fault detection unit are provided at a graphics processing unit of the graphics processing system, and the check unit is configured to make available the first and/or second signatures to a second check unit external to the graphics processing unit, the second check unit being configured to read back processed data written to the data store by the graphics processing unit in respect of a task of the first type so as to generate a further signature characteristic of that processed data held at the data store, and a second fault detection unit provided for the second check unit is configured to compare the further signature to one or both of the first and/or second signatures made available by the check unit in respect of that task of the first type, the second fault detection unit being configured to raise a fault signal if the further signature does not match one or both of the first and second signatures.

19. The graphics processing system as claimed in claim 1, wherein each processing unit is a different physical core of a graphics processing unit of the graphics processing system.

20. A method of processing tasks at a graphics processing system having a plurality of processing units each configured to process a task independently from any other processing unit, the method comprising, on receiving a task of a first type for processing:
    process the task for a first time at a first processing unit and form a first signature characteristic of an output of that first processing unit;
    process the task for a second time at a second processing unit and form a second signature characteristic of an output of that second processing unit;
    compare the first and second signatures; and
    if the first and second signatures do not match, raise a fault signal; and
    on receiving a task of a second type for processing:
        process the task of the second type only a first time at a processing unit of the plurality of processing units so as to generate a respective single processed output.

21. A non-transitory computer readable storage medium having stored thereon a computer readable description of an integrated circuit that, when processed in an integrated circuit manufacturing system, causes the integrated circuit manufacturing system to manufacture a graphics processing system comprising:
    a plurality of processing units for processing tasks, each processing unit being configured to process a task independently from any other processing unit of the plurality of processing units;
    a check unit operable to form a signature which is characteristic of an output of a processing unit on processing a task; and
    a fault detection unit operable to compare signatures formed at the check unit;
    wherein the graphics processing system is configured to process each task of a first type first and second times at the plurality of processing units so as to, respectively, generate first and second processed outputs, wherein the check unit is configured to form first and second signatures which are characteristic of, respectively, the first and second processed outputs, and wherein the fault detection unit is configured to compare the first and second signatures and raise a fault signal if the first and second signatures do not match; and
    wherein each task of a second type is processed only a first time at the plurality of processing units so as to generate a respective single processed output.

* * * * *